United States Patent [19]

Cascione

[11] Patent Number: 4,767,029
[45] Date of Patent: Aug. 30, 1988

[54] FEEDER ASSEMBLY FOR HIGHLY VISCOUS PARTICULATE MATERIAL

[75] Inventor: Alexander S. Cascione, Yonkers, N.Y.

[73] Assignee: Nabisco Brands, Inc., Parsippany, N.J.

[21] Appl. No.: 884,008

[22] Filed: Jul. 10, 1986

[51] Int. Cl.⁴ ............... G01F 11/00; G01F 11/20; B01F 7/00
[52] U.S. Cl. .................. 222/227; 222/236; 222/238; 366/297; 366/300
[58] Field of Search ............ 222/226, 227, 236, 238; 366/297, 300, 325, 326, 603

[56] References Cited

U.S. PATENT DOCUMENTS

| | | |
|---|---|---|
| 1,668,324 | 5/1928 | Kreisinger . |
| 1,699,417 | 1/1929 | Wilson . |
| 2,019,202 | 10/1935 | Taylor . |
| 2,078,777 | 4/1937 | Schade . |
| 2,092,720 | 9/1937 | Urquhart . |
| 2,520,577 | 8/1950 | Tooley ........................ 366/325 X |
| 2,693,879 | 11/1954 | Gehrman . |
| 2,698,962 | 1/1955 | Swallow . |
| 2,814,261 | 11/1957 | Meagher et al. . |
| 3,326,144 | 6/1967 | Palmer . |
| 3,336,008 | 8/1967 | Zoethout . |
| 3,380,715 | 4/1968 | Van Der Schee . |
| 3,414,982 | 12/1968 | Oas . |
| 3,615,044 | 10/1971 | Bonneric . |
| 3,632,091 | 7/1969 | Ford . |
| 3,738,617 | 6/1973 | Madonia ...................... 366/300 X |
| 3,764,113 | 10/1973 | Weidenmiller . |
| 3,879,150 | 4/1975 | Brown et al. . |
| 3,933,086 | 1/1976 | Standing . |
| 4,024,993 | 5/1977 | Hanada . |
| 4,137,023 | 1/1979 | Moked et al. . |
| 4,211,492 | 7/1980 | Konig et al. . |
| 4,229,286 | 10/1980 | Bridges . |
| 4,363,428 | 12/1982 | Kruger ........................ 222/236 X |

FOREIGN PATENT DOCUMENTS 11969  3/1909  Denmark .................... 366/297

Primary Examiner—Joseph J. Rolla
Assistant Examiner—Lisa C. Waag
Attorney, Agent, or Firm—Richard Kornutik

[57] ABSTRACT

In a feeder assembly for highly viscous particulate material, a hopper is provided with two pairs of counterrotating agitators, one pair being disposed above the other. Each agitator is provided with a plurality of blades or paddles located in planes extending radially and longitudinally relative to the respective axis of rotation. Each blade or paddle in turn comprises a plurality of transverse rods equispaced from each other in the longitudinal direction of the respective agitator, as well as a longitudinally extending rod connected to the outer ends of the transverse rods. The agitators are driven so that the portions thereof at the nips of the respective agitator pairs move upwardly away from the outlet of the hopper.

7 Claims, 1 Drawing Sheet

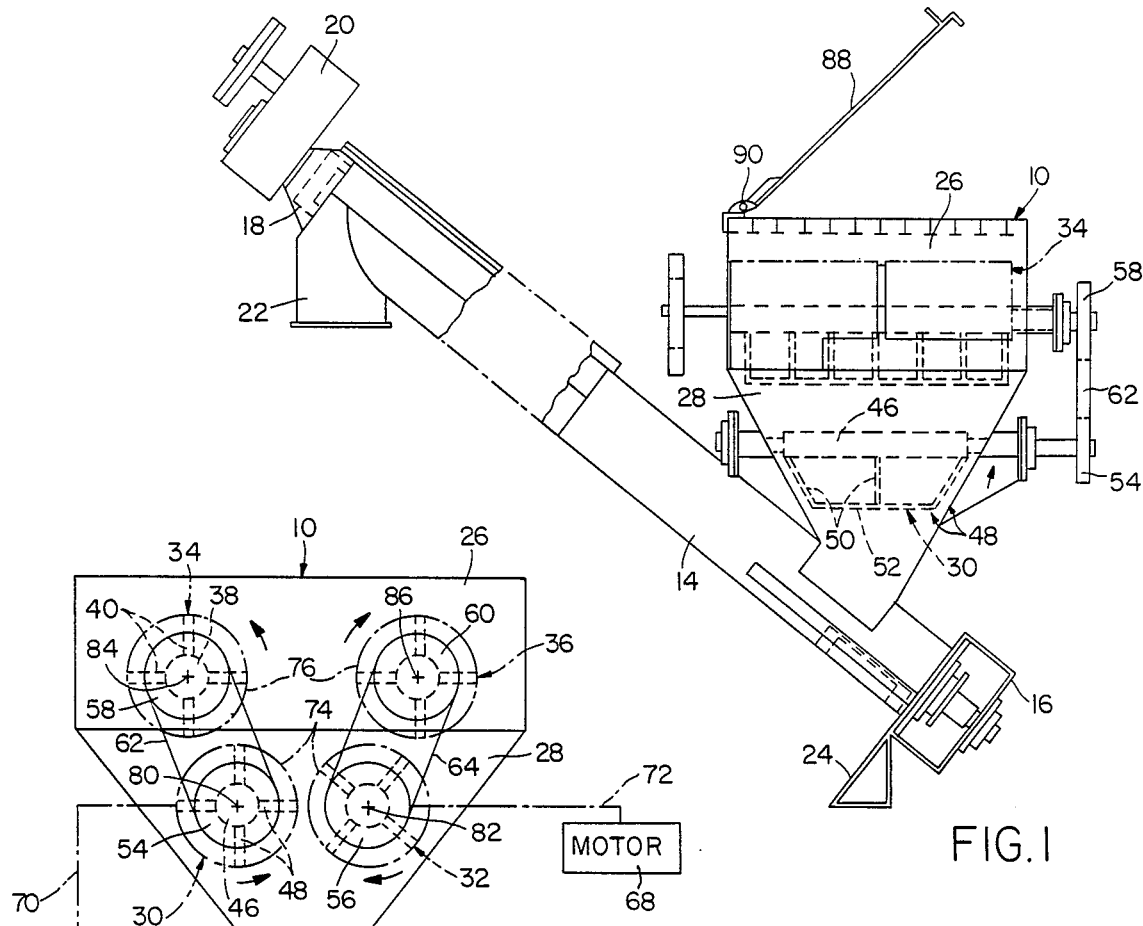
FIG. 1
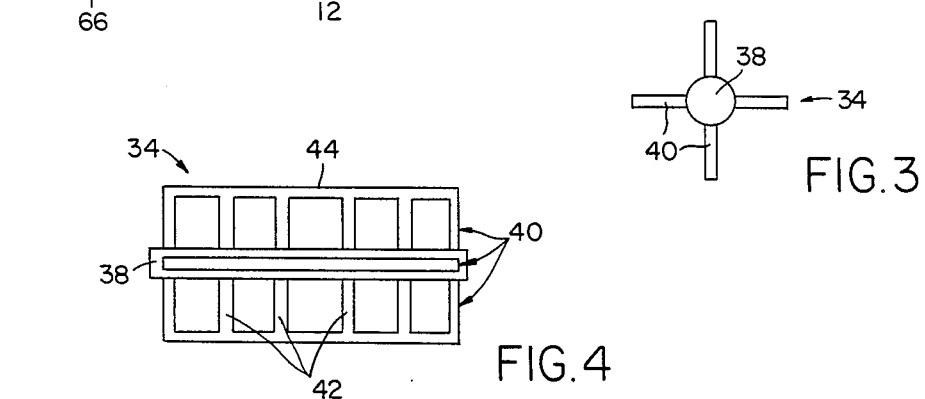
FIG. 2
FIG. 3
FIG. 4

4,767,029

FEEDER ASSEMBLY FOR HIGHLY VISCOUS PARTICULATE MATERIAL

BACKGROUND OF THE INVENTION

This invention relates to a feeder assembly for highly viscous particulate material.

In the processing of highly viscous particulate material such as saw dust, brown sugar, ground hard candy and cookie mixes wherein the cookie particles are coated with oil, frequently the viscous particulate material is temporarily stored in a hopper prior to conveyance to a processing station. Because these materials have a high degree of surface stickiness, the material in the hopper tends to adhere to the sides of the hopper, whereby tunnels are formed in the hopper supply.

Many feeder assemblies for the transport of viscous materials have been disclosed, which feeder assemblies include counterrotating rolls or gears disposed at the bottom of a hopper or reservoir for forcing viscous material from the hopper out through an outlet at the bottom of the hopper. For example, U.S. Pat. No. 4,137,023 to Moked et al. is directed to an apparatus for the recovery, compounding and fabricating of plastic material, the apparatus including a gear pump disposed at the bottom of a gear housing in juxtaposition to an outlet thereof. The gears are driven so that portions thereof located at a meshing zone above the gear housing outlet move away from the outlet. Moked et al. is directed in particular to the provision of sealing inserts at the outlet for engaging the teeth of the gears to improve pump efficiencies. In U.S. Pat. No. 2,814,216 to Meagher et al., a pair of counterrotating rolls are disposed near the outlet end of a hopper, the portions of the rolls at the nip therebetween moving downwardly towards the outlet of the hopper. Like Moked et al., U.S. Pat. Nos. 2,698,962, 2,019,202 and 1,699,417 all disclose feeding apparatus for viscous materials wherein the apparatus includes counterrotating rolls or gears having directions of rotation such that portions of the rolls or gears at a meshing zone or nip of the rotating members move away from a hopper outlet.

Further devices for use in processing highly viscous materials have been proposed, which devices include two pairs of counterrotating rollers juxtaposed to one another. U.S. Pat. No. 3,632,091 to Ford exemplarily discloses a machine for preparing plasticized thermoplastics material by passing a plastic strip through a nip between a first pair of counterrotating rolls below which rolls is disposed a second pair of counterrotating rolls. The rolls define respective nips located above one another and above an outlet to a roll housing. The rolls all rotate downwardly towards the outlet at the nips of the rolls.

U.S. Pat. Nos. 2,092,720 to Urquhart and 2,078,777 to Schade are directed to rubber or plastics processing machines each having two pairs of counterrotating rolls, the lower pair rotating upwardly at a common nip and the upper rolls rotating downwardly at a common nip. U.S. Pat. No. 2,693,879 to Gahrman discloses a similar configuration of rolls for transporting solids into or from a gas or liquid.

None of the above-described patents is directed in particular to the transport of highly viscous particulate material. Accordingly, none of the discloses devices appears to be especially effective in the feeding of such material.

An object of the present invention is to provide an improved feeder assembly especially adapted for feeding highly viscous particulate material.

Another object of the present invention is to provide such an assembly with a hopper for holding the particulate material, wherein the formation of tunnels in the contained material is eliminated.

Yet another object of the present invention is to provide such an assembly in which improved agitators are disposed in the hopper.

SUMMARY OF THE INVENTION

A feeder assembly for highly viscous particulate material comprises, in accordance with the present invention, a receptacle or hopper for containing a supply of the viscous particulate material, a transport mechanism disposed at the hopper for moving the viscous particulate material therefrom through an outlet of the hopper and for transporting the material away from the outlet, and stirring agitators disposed in the hopper for agitating the viscous particulate material contained therein to prevent the formation of tunnels in the contained material and for facilitating transport of the material from the hopper by the transport mechanism. The stirring agitators include a first pair of counterrotating agitators disposed at the outlet and a second pair of counterrotating agitators disposed on a side of the first pair opposite the outlet.

A drive mechanism is operatively coupled to the agitators for rotating the members of the first pair about a first and second axis respectively, and for rotating the members of the second pair of agitators about a third and a fourth axis, respectively. The members of the first pair of agitators have first portions which move away from the outlet during operation of the drive means, those first portions being located between the first and the second axis. The members of the second pair of agitators likewise have second portions moving away from the outlet during operation of the drive means, the second portions being located between the third and the fourth axis.

This method of rotating the agitators, wherein the velocity vectors at the nips defined by the respective agitator pairs point away from the hopper outlet, results in an effective stirring of the particulate material contained in the hopper, particularly if the agitators take a form in accordance with the present invention. In a preferred form, each agitator is provided with a plurality of blade members each extending in a longitudinally and radially oriented plane with respect to an axis of rotation of the respective agitator. In addition, each blade member includes a plurality of radially extending rods longitudinally spaced from one another along the length of the respective agitator. Each blade member further includes a longitudinally extending rod connected to each of the radially extending rods of the respective blade member, the longitudinally extending rod being spaced from the axis of rotation of the respective agitator.

The form of the agitator in accordance with the present invention sufficiently mixes the particulate material contained in the hopper so that the material becomes flowable and so that the formation of tunnels in the contained material is eliminated.

In accordance with a particular feature of the present invention, the hopper has a lower portion in the form of a truncated pyramid converging towards the hopper outlet. The first pair of counterrotating agitators is disposed in the lower portion of the hopper, each member of the first pair of agitators being provided with conically shaped ends. Specifically, the blade members of the lower pair of agitators are provided at their ends with rods inclined at an acute angle with respect to the axes of symmetry of the respective agitators and connected at respective outer ends to a respective longitudinally extending rod. It is to be noted that the longitudinal rods are particularly important for carrying out the purpose of stirring the viscous material. Without the longitudinal rods, the formation of tunnels is not significantly inhibited.

BRIEF DESCRIPTION OF THE DRAWING

FIG. 1 is a schematic front elevational view of a feeder assembly in accordance with the present invention, showing a hopper in which two pair of counterrotating agitators are disposed.

FIG. 2 is a side elevational view of the hopper of FIG. 1, with a hopper lid shown in FIG. 1 removed.

FIG. 3 is an end view of an agitator illustrated in FIG. 1.

FIG. 4 is a front elevational view of the agitator shown in FIG. 3.

DETAILED DESCRIPTION

As illustrated in FIG. 1, a feeder assembly for highly viscous particulate material comprises a hopper 10 communicating via an outlet 12 at a lower end with an elongate housing 14 in which a screw conveyor or worm (not illustrated) is disposed. The screw conveyor is rotatably mounted to a lower end of conveyor housing 14 via a flange bearing 16. At an upper end of conveyor housing 14, the screw conveyor is rotatably journaled in a Teflon TM packing gland 18. A rotary drive motor 20 is mounted to the upper end of conveyor housing 14 and is operatively connected to the screw conveyor for rotating the same. Conveyor housing 14 is provided at the upper end with an outlet port 22 and at the lower end with a support bracket 24 securable to a floor or other support.

As illustrated in FIGS. 1 and 2, hopper 10 includes an upper portion 26 having a prismatic shape and a lower portion 28 substantially in the form of a truncated pyramid. Rotatably mounted to a pair of opposite side walls of pyramidal portion 28 are two substantially identical agitators 30 and 32. Another two agitators 34 and 36 are rotatably journaled in a pair of opposite side walls of prismatic hopper portion 26.

FIGS. 3 and 4 are end and side views of agitator 34, respectively. Agitator 34 includes a central shaft or body portion 38 to which four substantially identical blades or paddles 40 are connected, the blades or paddles 40 being disposed in longitudinally and radially oriented planes relative to the respective shaft 38. As best seen in FIG. 4, each blade or paddle 40, comprises a plurality of radially extending rods 42 equispaced from each other in the longitudinal direction of shaft 38. Each blade or paddle 40 further comprises a longitudinally extending rod 44 oriented parallel to shaft 38 and connected to the ends of radial rods 42. Agitator 36 is essentially identical in structure to agitator 34.

As illustrated in FIGS. 1 and 2, agitator 30 includes a central support shaft 46 and a plurality of blades or paddles 48 located in planes extending radially and longitudinally with respect to shaft 46. As shown in FIG. 1, each blade or paddle 48 comprises a plurality of first rods 50 extending substantially transversely with respect to shaft 46. Each blade or paddle 48 further comprises a respective longitudinally extending rod 52 connected to the ends of the substantially transverse rods 50 of the respective agitator blade or paddle 48. In FIG. 1 only one blade or paddle 48 is illustrated for purposes of clarity. As shown in that figure, the transverse rods 50 at the ends of a blade or paddle 48 are inclined at an angle with respect to shaft 46, whereby agitator 30 assumes at its longitudinal ends a conical shape which conforms to the converging side walls of pyramidal lower portion 28 of hopper 10. Agitator 32 is essentially identical in structure to agitator 30.

As illustrated in FIG. 2, each agitator 30, 32, 34 and 36 is provided at an end outside of hopper 10 with a respective pulley 54, 56, 58 and 60. Preferably, agitator 32 has its pulley 54 rotatably coupled to pulley 58 via an endless belt 62, while pulley 56 of agitator 32 is rotatably coupled to the pulley 60 via another endless belt 64. One member of each pair of rotatively coupled agitators, e.g., agitators 30 and 32, is operatively connected to a respective drive motor 66 or 68 via a respective power transmission train, schematically indicated by a dot-dash line 70 or 72. Rotary power generated by motors 66 and 68 is transmitted from agitators 30 and 32 to agitators 34 and 36 via endless belts 62 and 64. Other methods of transmitting rotary power to agitators 30, 32, 34 and 36 to achieve the desired degree of mixing or stirring in accordance with the present invention can be easily conceived and implemented by one or ordinary skill in the art.

As shown in FIG. 2, the longitudinally extending rods 52 of agitators 30 and 32 describe circular surfaces of revolution 74 which are spaced at all points from one another, from outlet 12 of hopper 10, from all inner surfaces of the hopper and from cylindrical surfaces of revolution 76 defined by the motion of longitudinal rods 44 of agitators 34 and 36. Similarly, surfaces of revolution 76 of agitators 34 and 36 are spaced at all points from one another, from the outlet of hopper 12, from the surfaces of revolution 74 of agitators 30 and 32 and from all inner surfaces of the hopper. Advantageously, the substantially transverse end rods of the agitators are spaced at a distance of $\frac{1}{4}$-$\frac{1}{2}$ inches from the inner surfaces of hopper 10.

Motors 64 and 68 rotate agitators 30, 32, 34 and 36 about respective axes of rotation 80, 82, 84 and 86 so that at the nip between agitators 30 and 32 and at the nip between agitators 34 and 36 the agitator blades or paddles move in an upward direction, i.e., away from outlet 12 as indicated by arrows in FIG. 2.

During operation of the feeder assembly illustrated in FIG. 1, highly viscous particulate material such as ground candy is placed in hopper 10 via an opening which is coverable by a lid 88 pivotably connected to prismatic portion 26 of hopper 10 by means of a hinge 90. The particulate material is drawn from hopper 10 via outlet 12 through the action of the inclined screw conveyor (not illustrated). The formation of tunnels in the material contained within hopper 10 during the operation of the screw conveyor is prevented by the stirring action of agitators 30, 32, 34 and 36. The directions of rotation of agitators 30, 32, 34 and 36 and the design of blades or paddles 40 and 48 in accordance with the invention have been found to be particularly effective in stirring or agitating the viscous particulate material in hopper 10 to facilitate the drawing of the material from the hopper.

It is to be noted that the surfaces of revolution described by rotating longitudinal rods 44 and 52 may advantageously intersect each other in some applications. In this case, blades 40 or 48 on one agitator overlap or mesh with the blades on one or more of the other agitators.

Although the invention has been described in terms of particular embodiments and applications, one of ordinary skill in the art, in light of this teaching, can generate additional embodiments and modifications without departing from the spirt of or exceeding the scope of the claimed invention. Accordingly, it is to be understood that the descriptions and illustrations herein are proffered by way of example to facilitate comprehension of the invention and should not be construed to limit the scope thereof.

What is claimed is:

1. A feeder assembly for highly viscous particulate material, comprising:
    receptacle means including a hopper for containing a supply of the viscous particulate material, said hopper having an outlet and a lower portion in the form of a truncated pyramid converging towards said outlet;
    transport means disposed at said hopper for moving the viscous particulate material from said hopper through said outlet and for transporting the material away from said outlet;
    stirring means disposed in said hopper for agitating the viscous particulate material contained in said hopper to prevent the formation of tunnels in the contained material during operation of said transport means and for thereby facilitating transport of highly viscous particulate material from said hopper by said transport means, said stirring means including a first pair of counterrotating agitators disposed at said outlet and a second pair of counterrotating agitators disposed on a side of said first pair opposite said outlet, said agitators being each provided with a plurality of blade members, each of said blade members extending in a longitudinally and radially oriented plane with respect to an axis of rotation of the respective agitator, said blade members each additionally including a plurality of radially extending rods longitudinally spaced from one another along the length of the respective agitator, said blade members each additionally including a longitudinally extending rod connected to each of the radially extending rods of the respective blade member and spaced from the axis of rotation of the respective agitator, said first pair of counterrotating agitators being disposed in said lower portion, the members of said first pair of counterrotating agitators each having two opposed conically shaped ends spaced from one another along an axis of rotation of the respective agitator, said conically shaped ends taking the form of rods inclined at an acute angle with respect to the axes of rotation of the respective agitators and connected at respective outer ends to a respective longitudinally extending rod.

2. In a feeder asembly for highly viscous particulate material, said assembly comprising receptacle means including a hopper for containing a supply of the viscous particulate material, said hopper having an outlet and a lower portion in the form of a truncated pyramid converging towards said outlet, said assembly further comprising transport means disposed at said hopper for moving the viscous particulate material from said hopper through said outlet and for transporting the material away from said outlet, the improvement wherein stirring means are disposed in said hopper for agitating the viscous particulate material contained in said hopper to prevent the formation of tunnels in the contained material during operation of said transport means and for thereby facilitating transport of highly viscous particulate material from said hopper by said transport means, said stirring means including at least one pair of counterrotating agitators disposed in said hopper, said agitators being each provided with a plurality of blade members, each of said blade members extending in a longitudinally and radially oriented plane with respect to an axis of rotation of the respective agitator, said blade members each including a plurality of radially extending rods longitudinally spaced from one another along the length of the respective agitator, said blade members each additionally including a longitudinally extending rod connected to each of the radially extending rods of the respective blade member and spaced from the axis of rotation of the respective agitator, said first pair of counterrotating agitators being disposed in said lower portion, each members of said one pair of counterrotating agitators having two opposed conically shaped ends spaced from one another along an axis of rotation of the respective agitator, said conically shaped ends taking the form of rods inclined at an acute angle with respect to the axes of rotation of the respective agitators and connected at respective outer ends to a respective longitudinally extending rod.

3. A feeder assembly for highly viscous particulate material, comprising:
    receptacle means including a hopper for containing a supply of the viscous particulate material, said hopper having an outlet;
    transport means disposed at said hopper for moving the viscous particulate material from said hopper through said outlet and for transporting the material away from said outlet;
    stirring means disposed in said hopper for agitating the viscous particulate material contained in said hopper to prevent the formation of tunnels in the contained material during operation of said transport means and for thereby facilitating transport of highly viscous particulate material from said hopper by said transport means, said stirring means including a first pair of counterrotating agitators disposed at said outlet and a second pair of counterrotating agitators disposed on a side of said first pair opposite said outlet, said first pair and said second pair of counterrotating agitators definging in their motions first outer surfaces of revolution and second outer surfaces of revolution, respectively, said first outer surfaces of revolution being spaced at all points from one another, from said outlet, from said second outer surfaces of revolution and from all inner surfaces of said hopper, said second outer surfaces of revolution being spaced at all points from one another, from said first outer surfaces of revolution and from all inner surfaces of said hopper, said first outer surfaces of revolution being spaced a first distance from one another at a first nip and said second outer surfaces of revolution being spaced a second distance from one another at a second nip; and
    drive means operatively coupled to said agitators for rotating same so that portions of said first agitators located at said first nip and portions of said second agitators located at said second nip move away from said outlet during operation of the feeder assembly;

said hopper has a lower portion in the form of a truncated pyramid converging towards said outlet, said first pair of counterrotating agitators being disposed in said lower portion, the members of said first pair of counterrotating agitators each having two opposed conically shaped ends spaced from one another along an axis of rotation of the respective agitator.

4. A feeder assembly according to claim 3 wherein said transport means comprises an inclined screw conveyor.

5. A feeder assembly for highly viscous particulate material, comprising:

receptacle means including a hopper for containing a supply of the viscous particulate material, said hopper having an outlet;

transport means disposed at said hopper for moving the viscous particulate material from said hopper through said outlet and for transporting the material away from said outlet;

stirring means disposed in said hopper for agitating the viscous particulate material contained in said hopper to prevent the formation of tunnels in the contained material during operation of said transport means and for thereby facilitating transport of highly viscous particulate material from said hopper by said transport means, said stirring means including a first pair of counterrotating agitators disposed at said outlet and a second pair of counterrotating agitators disposed on a side of said first pair opposite said outlet, said first pair and said second pair of counterrotating agitators defining in their motions first outer surfaces of revolution and second outer surfaces of revolution, respectively, said first outer surfaces of revolution being spaced at all points from one another, from said outlet, from said second outer surfaces of revolution and from all inner surfaces of said hopper, said second outer surfaces of revolution being spaced at all points from one another, from said outlet, from said first outer surfaces of revolution and from all inner surfaces of said hopper, said first outer surfaces of revolution being spaced a first distance from one another at a first nip and said second outer surfaces of revolution being spaced a second distance from one another at a second nip; and drive means operatively coupled to said agitators for rotating same so that portions of said first agitators located at said first nip and portions of said second agitators located at said second nip move away from said outlet during operation of the feeder assembly;

said outlet is disposed at a lower end of said hopper and said first nip is disposed vertically above said outlet;

said second nip is disposed vertically above said first nip and said outlet;

said second distance is larger than said first distance;

said hopper has a lower portion in the form of a truncated pyramid converging towards said outlet, said first pair of counterrotating agitators being disposed in said lower portion, the members of said first pair of counterrotating agitators each having two opposed conically shaped ends spaced from one another along an axis of rotation of the respective agitator.

6. A feeder assembly according to claim 5 wherein said agitators are each provided with a plurality of blade members, each of said blade members extending in a longitudinally and radially oriented plane with respect to an axis of rotation of the respective agitator.

7. A feeder assembly according to claim 6 wherein said blade members each include a plurality of radially extending rods longitudinally spaced from one another along the length of the respective agitator, said blade members each additionally including a longitudinally extending rod connected to each of the radially extending rods of the respective blade member and spaced from the axis of rotation of the respective agitator.

* * * * *